(12) United States Patent
Fujino

(10) Patent No.: US 6,912,430 B2
(45) Date of Patent: Jun. 28, 2005

(54) EXECUTION DEVICE AND DEBUG DEVICE FOR MOTION PROGRAM

(75) Inventor: Kazuo Fujino, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 99 days.

(21) Appl. No.: 10/452,912

(22) Filed: Jun. 3, 2003

(65) Prior Publication Data

US 2004/0153892 A1 Aug. 5, 2004

(30) Foreign Application Priority Data

Jun. 3, 2002 (JP) .................................... P. 2002-161023

(51) Int. Cl.[7] .............................................. G05B 11/01
(52) U.S. Cl. .............................. 700/23; 700/18; 700/26; 700/86; 700/87; 700/181; 700/250; 318/561; 718/100; 718/107
(58) Field of Search .............................. 700/23, 18, 86, 700/87, 88, 26, 181, 252, 250; 718/1, 100, 107; 318/561

(56) References Cited

U.S. PATENT DOCUMENTS

| | | | | |
|---|---|---|---|---|
| 4,683,549 A | * | 7/1987 | Takaki | 712/244 |
| 5,162,986 A | * | 11/1992 | Graber et al. | 700/17 |
| 6,130,515 A | * | 10/2000 | Nishimura | 318/567 |
| 6,401,005 B1 | * | 6/2002 | Schwarz et al. | 700/159 |
| 6,470,377 B1 | * | 10/2002 | Sevcik et al. | 709/201 |
| 2003/0090230 A1 | * | 5/2003 | Fujibayashi et al. | 318/625 |

FOREIGN PATENT DOCUMENTS

| | | | | |
|---|---|---|---|---|
| JP | 8-63205 A | | 3/1996 | |
| JP | 11121442 A | * | 4/1999 | G03F/7/40 |
| JP | 11226801 A | * | 8/1999 | B23B/3/06 |

* cited by examiner

Primary Examiner—Ramesh Patel
(74) Attorney, Agent, or Firm—Sughrue Mion, PLLC

(57) ABSTRACT

An executing apparatus for executing a motion program which contains both a motion instruction for controlling operation of a machine, and an instruction for controlling input/output with respect to an external appliance. The apparatus comprises a motion executing unit, an IO executing unit and an event managing unit. The motion executing unit contains an object memory for registering the motion instruction. An event registers an execution condition of the motion instruction. An action memory registers an execution command of the motion instruction. The IO executing unit contains an object memory for registering an output instruction used to control an output signal supplied to the external appliance. An event memory registers a condition of an input signal state supplied from the external appliance. An action memory executes the output instruction. The event managing unit registers an event management table for establishing a relationship between the motion executing unit and the IO executing unit before executing the motion instruction.

3 Claims, 9 Drawing Sheets

FIG. 6

```
(01) DeclareMove([X]B);
(02) DeclareMove([X]C);
(03) DeclareMove([X]D);
(04) DeclareMove([Y]E);
(05) DeclareMove([X]A);
(06) DeclareEvent(SW1==ON);
(07) DeclareAction(START(01));
(08) DeclareEvent(COMPLETE(01));
(09) DeclareAction(START(02));
(10) DeclareEvent(SW2==ON);
(11) DeclareAction(START(03));
(12) DeclareEvent(SW3==ON);
(13) DeclareAction(START(04));
(14) DeclareEvent(SW4==ON);
(15) DeclareAction(START(05));
(16) DeclareEvent(COMPLETE(05));
(17) Subscribe(EVENR(06), ACTION(07));
(18) Subscribe(EVENR(08), ACTION(09));
(19) Subscribe(EVENR(10), ACTION(11));
(20) Subscribe(EVENR(12), ACTION(13));
(21) Subscribe(EVENR(14), ACTION(15));
(22) WaitFirEvent(EVENR(16));
(23) return;
```

FIG. 7

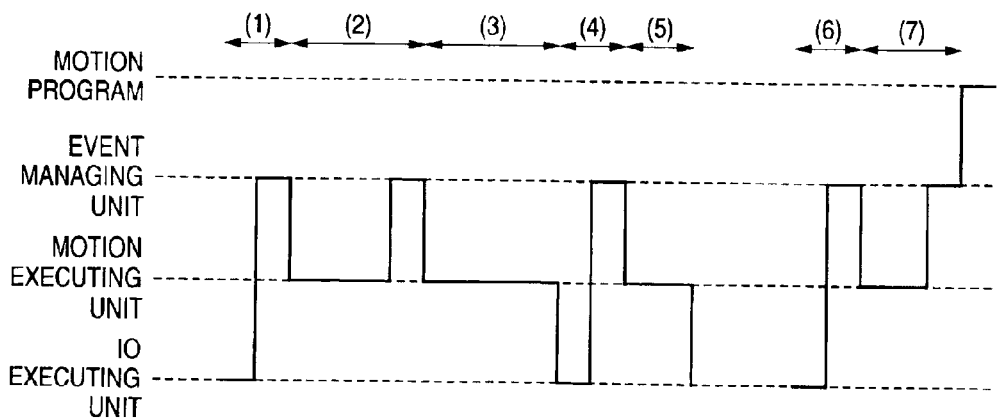

| NUMBER | HANDLE | TITLE | CALENDAR |
|---|---|---|---|
| (1) | EVENT(06) | SW1==ON | 00:00:00:000 |
| (2) | ACTION(07) | START(01) | 00:00:00:001 |
| (3) | EVENT(08) | COMPLETE(01) | 00:00:01:010 |
| (4) | ACTION(09) | START(02) | 00:00:01:012 |
| (5) | EVENT(10) | SW2==ON | 00:00:05:522 |
| (6) | ACTION(11) | START(03) | 00:00:05:525 |
| (7) | EVENT(14) | SW4==ON | 00:00:08:034 |
| (8) | ACTION(15) | START(05) | 00:00:08:035 |
| (9) | EVENT(16) | COMPLETE(05) | 00:00:12:799 |

FIG. 11
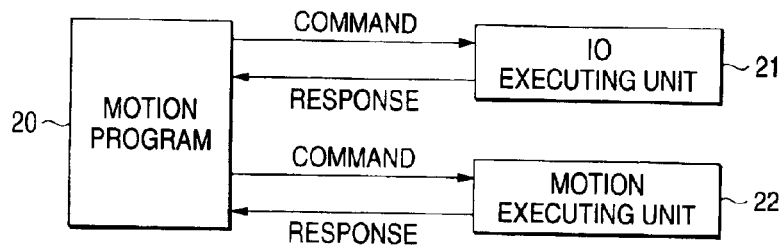
FIG. 12
```
(01) while(Getlo(SW1)!=ON);
(02) StartMove([X]B);
(03) StartMove([X]C);
(04) if(Getlo(SW2)==ON)
(05) {
(06)     StartMove([X]D);
(07) }
(08) else if(Getlo(SW3)==ON)
(09) {
(10)     StartMove([Y]E);
(11) }
(12) while(Getlo(SW4)!=ON);
(13) StartMove([X]A);
(14) return;
```
FIG. 13
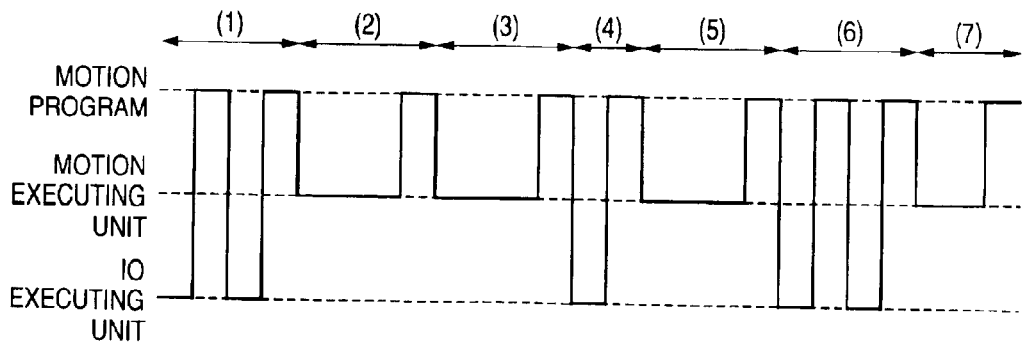

EXECUTION DEVICE AND DEBUG DEVICE FOR MOTION PROGRAM

BACKGROUND OF THE INVENTION

1. Field of the Invention

The present invention is related to a motion program executing apparatus of a motion control apparatus for performing a positioning control of an appliance to be controlled such as industrial machinery based upon a motion program, and also related to a motion program debugging apparatus.

2. Description of the Related Art

Conventionally, a motion program has been executed in accordance with a serial executing (serial processing) type system in which a program is basically and sequentially executed from an upper program portion to a lower program portion. As indicated in FIG. 11, when an instruction which is executed by a motion program 20 corresponds to an IO instruction, a command is issued to an IO executing unit 21, a response is confirmed, and thereafter, a next instruction is executed. Also, when an instruction which is executed by the motion program 20, a command is issued to a motion executing unit 22, a response is confirmed, and thereafter, a next instruction is executed. The motion program 20 is serially executed in accordance with the above-described program executing system.

For instance, in order to execute process operation explained in a flow chart of FIG. 3, such a motion program as shown in FIG. 12 is formed. As described in a program column (01) of the motion program shown in FIG. 12, for example, the motion program waits that an SW1 signal becomes ON by a GetIo function; when the SW1 signal is turned ON, the motion program issues such a command that an X axis is moved to a point "B" by a StartMove function of a program column (02); and when an execution of this command is completed, the motion program executes a program column (03). A process step (1) of FIG. 3 corresponds to the program column (01) of FIG. 12; a process step (2) of FIG. 3 corresponds to the program column (02) of FIG. 12; and a program step (3) of FIG. 3 corresponds to the program column (03) of FIG. 12. Also, a process step (4) of FIG. 3 corresponds to a program column (04) of FIG. 12; a process step (5) of FIG. 3 corresponds to a program column (06) of FIG. 12; and a program step (6) of FIG. 3 corresponds to a program column (12) of FIG. 12. Further, a process step (7) of FIG. 3 corresponds to a program column (13) of FIG. 12. FIG. 13 shows an execution timing diagram in the case that a signal SW2 is turned ON in this motion program.

Although such a motion control apparatus is not disclosed, Japanese Laid-open Patent Application No. Hei-8-63205 discloses the step trailing control technique capable of simultaneously executing a plurality of steps which are coupled to each other in the series manner when the program is executed. Referring now to a flowchart of FIG. 14, this step trailing control technique described in Japanese Laid-open Patent Application No. Hei-8-63205 will be explained. That is, the programmable controller for executing the SFC program is comprised of: the block executing means, the activate step information storage table, the step executing means, the transfer executing means, and the transfer holding step executing means. The block executing means controls/executes the entire blocks of the SFC program. The activate step information storage table stores thereinto the step NO. of the activate step of the activate block. The step executing means checks the step NO. stored in the activate step information storage table, and then, executes the operation output thereof. The transfer executing means executes the transfer condition into the active step. The transfer holding step executing means checks the step attribute when the transfer by the transfer executing means is established, and if the checked step attribute corresponds to the transfer holding step, then the transfer holding step executing means continuously executes the execution step even after the present step has been transferred to the next step without deleting the execution step, and also, successively initiates the transfer-dectination step since the subsequent transfers are established.

However, in the conventional system, as indicated in FIG. 13, while the motion program is executed, any one of the motion program, the IO executing unit, and the motion executing unit is necessarily executed, so that the execution efficiency of this motion program is extremely lowered. In a serial executing system, since executions of instructions may depend upon a sequence described in a computer program, an instruction execution sequence cannot be changed without changing the content of this program. Also, if an execution of one instruction is not completed, then a process operation is not advanced to a next instruction, so that instructions cannot be executed at the same time.

Also, in the step trailing control technique described in Japanese Laid-open No. Hei-8-63205, since the activate steps are detected in the constant time interval called as "scan time", the CPU corresponding to the processing apparatus is required to execute the instructions without any rest time. At the same time, when the activate step is detected, there is such a problem that an overhead aspect may occur, depending upon the sequence of decoding/judging the activate steps within the scanning time period.

SUMMARY OF THE INVENTION

The present invention has an object to provide a program executing apparatus capable of improving an execution efficiency of a motion program, capable of changing an execution sequence of the motion program, and also, capable of executing instructions at the same time. Another object of the present invention is to provide a motion program debugging apparatus for time-sequentially tracing executions of instructions even when a motion program is transferred due to an establishing sequence.

A motion program executing apparatus, recited in claim 1 of the present invention, is featured by such an executing apparatus for executing a motion program which contains both a motion instruction for controlling operation of a machine, and an instruction for controlling input/output with respect to an external appliance, comprising: a motion executing unit containing an object memory for registering thereinto the motion instruction, an event memory for registering thereinto an execution condition of the motion instruction, and an action memory for registering thereinto an execution command of the motion instruction; an IO executing unit containing an object memory for registering thereinto an output instruction used to control an output signal supplied to the external appliance, an event memory for registering thereinto a condition of an input signal state supplied from the external appliance, and an action memory for executing the output instruction; and an event managing unit for registering thereinto an event management table for establishing a relationship between the motion executing unit and the IO executing unit before executing the motion instruction.

Also, a motion program executing apparatus, recited in claim 2 of the present invention, is featured by that the event management table establishes the relationship between the execution conditions of a plurality of the motion instructions with respect to one of the input signal states supplied from the external appliance.

Furthermore, a motion program debugging apparatus, recited in claim 3 of the present invention, is featured by such a debugging apparatus for debugging a motion program containing a motion program which contains both a motion instruction for controlling operation of a machine, and an instruction for controlling input/output with respect to an external appliance, comprising: a motion executing unit containing an object memory for registering thereinto the motion instruction, an event memory for registering an execution condition of the motion instruction, and an action memory for registering thereinto an execution command of the motion instruction; an IO executing unit containing an object memory for registering thereinto an output instruction used to control an output signal supplied to the external appliance, an event memory for registering thereinto a condition of an input signal state supplied from the external appliance, and an action memory for executing said output instruction; an event managing unit for containing thereinto an event management table for establishing a relationship between the motion executing unit and the IO executing unit; a calendar for detecting both a time instant when an execution condition of the motion program is established and a time instant when an execution command of the motion program is issued; and an event log processing unit provided with an event log processing unit which stores thereinto the execution condition of the motion program, the content of the execution command, and the time instants detected by the calendar.

In accordance with the above-explained motion program executing apparatus and motion program debugging apparatus, when an event is detected, the event managing unit performs an action, so that a registered instruction is executed, and thus, the motion program can be executed in a higher efficiency, while a CPU need not execute a signal waiting operation but also an instruction completion waiting operation within the motion program. Also, an execution sequence of motion instructions can be controlled by merely controlling an establishing sequence of events. Also, since a plurality of actions are defined in relation to a single event, instructions can be executed at the same time.

BRIEF DESCRIPTION OF THE DRAWING

FIG. 6 is a diagram for representing an example of contents of the motion program according to the present invention.

FIG. 7 is a timing chart for executing the motion program of the present invention.

FIG. 11 is the structural diagram of the conventional sequential executing type motion program.

FIG. 12 is a diagram for indicating the example of the conventional motion program.

FIG. 13 is a timing chart for executing the conventional motion program.

DETAILED DESCRIPTION OF THE PREFERRED EMBODIMENTS

Referring now to drawings, an embodiment of the present invention will be described.

(Embodiment 1)

A first embodiment of the present invention is explained with reference to FIG. 1.

Figure 1:
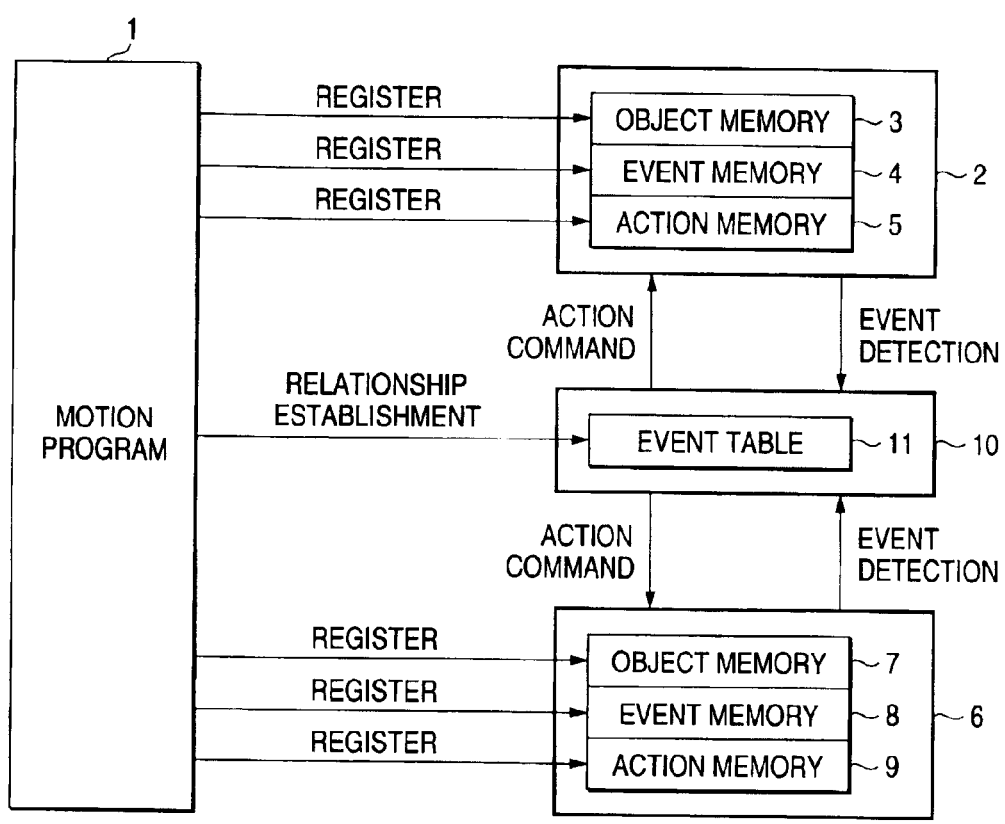
FIG. 1 is a structural diagram of a system for executing a motion program, according to a first embodiment of the present invention.

FIG. 1 schematically shows a system structural diagram used to realize a motion program of the present invention. This motion program realizing system is provided with an IO executing unit 2, a motion executing unit 6, and an event managing unit 10, and owns such a structure which can be registered/related from the motion program 1. The IO executing unit 2 contains an object memory 3 into which a motion instruction is registered, an event memory 4 into which events (for example, commencement of motion instruction and completion of motion instruction) are registered, and an action memory 6 into which an action (for instance, starting of execution of motion instruction) is registered. The motion executing unit 6 contains an object memory 7, an event memory 8, and an action memory 9. The object memory 7 registers thereinto output instructions of a signal and data. The event memory 8 registers thereinto such events as a state coincidence of input signals and a coincidence of data. The action memory 9 registers thereinto an action such as a commencement of a signal output. The event managing unit 10 owns an event table 11 which stores thereinto relationships between events and actions.

Figure 2:
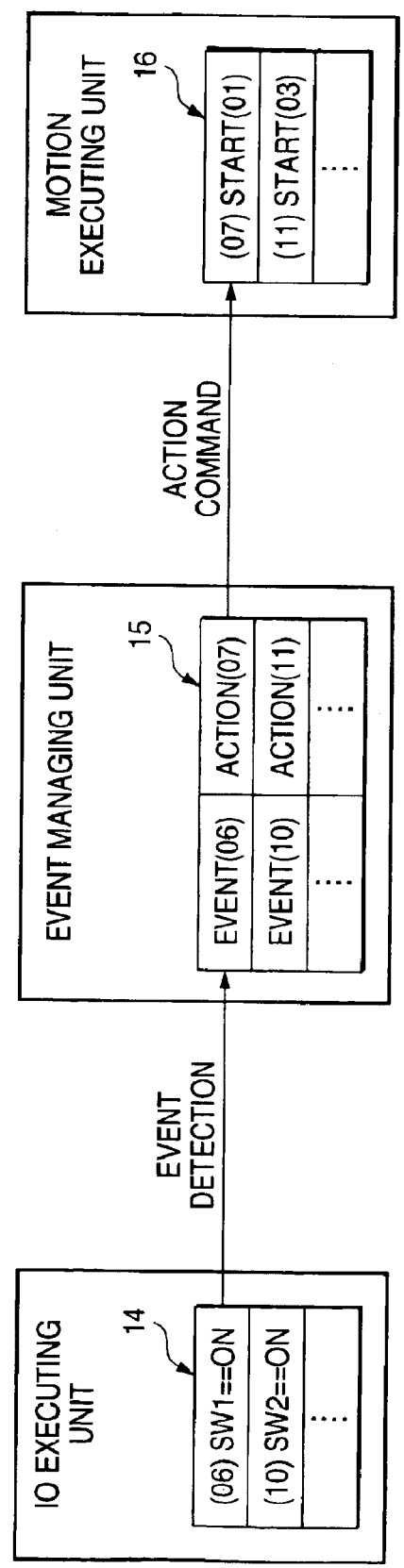
FIG. 2 is a relationship diagram for representing events and actions in the motion program of the present invention.

FIG. 2 is a diagram for indicating a relationship between the above-described events and actions. The IO executing unit 2 executes a detection of an event registered in the event memory 5. In the case that an event 14 is succeeded, the IO executing unit 2 notifies this succeeded event 14 to the event managing unit 10. Upon receipt of this notification, the event managing unit 10 retrieves an event table 15 having the notified event 14, and then, notifies an execution command of an action to the motion executing unit 6. Upon receipt of this notification, the motion executing unit 6 executes an action 16. Since an action of starting a (01) object has been registered in the action 16, the (01) object is initiated.

Figure 3:
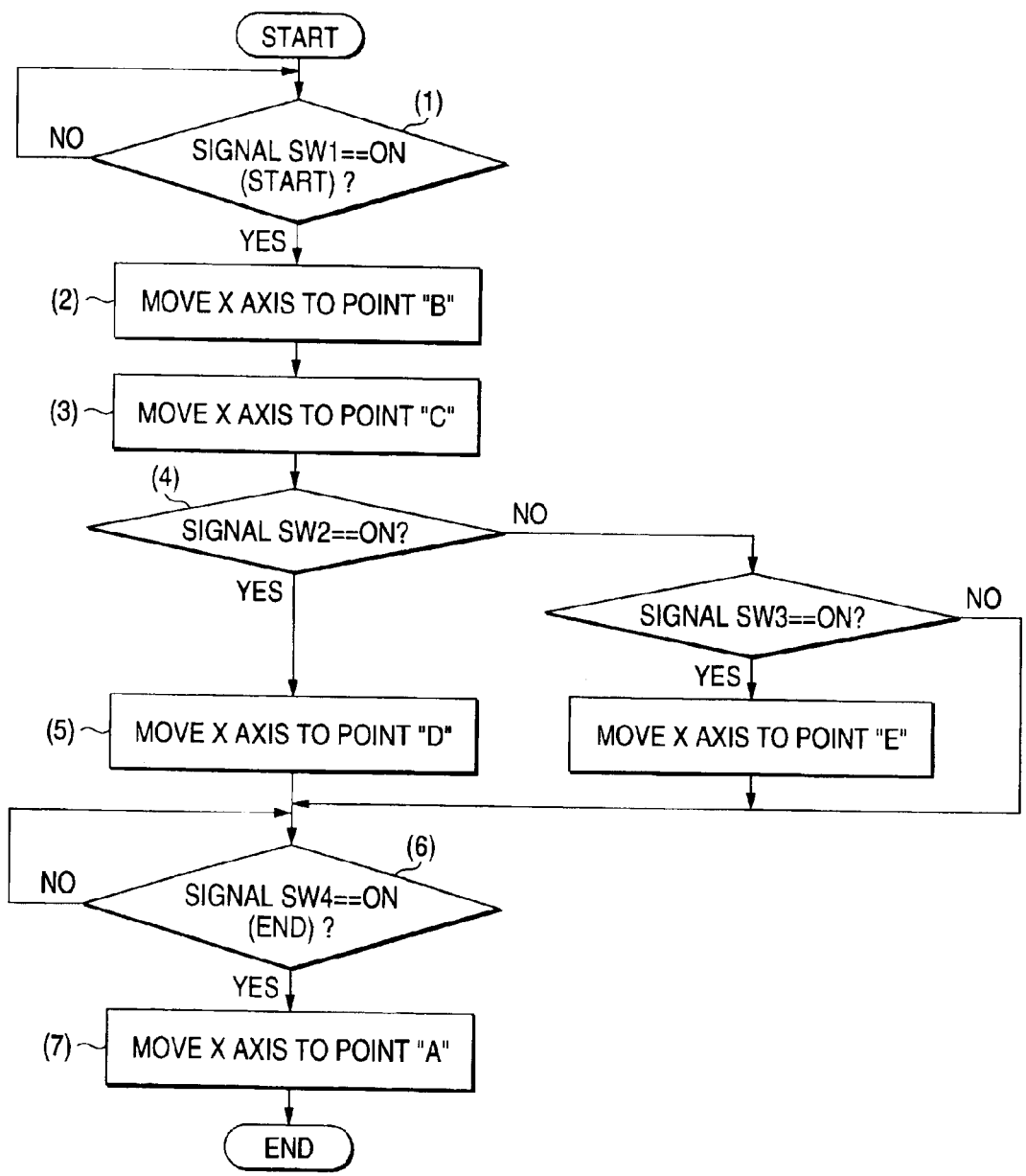
FIG. 3 is a flow chart for explaining an execution example of the motion program according to the present invention.

Next, while an example of a motion program is indicated, an executing apparatus of the motion program will now be explained. FIG. 3 is a flow chart for explaining executing operations of the motion program. When a START signal of SW1 is turned ON (step (1)), an X axis is moved up to a point "B" (step (2)), and after the X axis has been moved to the point "B", this X axis is moved to a point "C" (step (3)). When an SW2 has been turned ON (step (4)), the X axis is moved to a point "D" (step (5)). If the SW2 is turned OFF and an SW3 is turned ON, then the X axis is not moved to the point "D", but a Y axis is moved to a point "E." Also, if both the SW2 and the SW3 are turned OFF, then the X axis and the Y axis are not moved, but the motion program waits for an END signal of an SW4. When the SW4 is turned ON, the X axis is moved to the point "A", and this motion program is ended.

FIG. 6 indicates a motion program capable of realizing the above-explained flow chart. First, as indicated from a program column (01) up to a program column (05), an object to be moved is registered by using a DeclareMove function. Next, both an event corresponding to a starting condition of the object and an action corresponding to a starting command are registered. For instance, in a program column (06), such an event is registered in which when the SW1 is turned ON, this fact is notified by using a DeclareEvent function.

In a program column (07), such an action is registered in which the object registered in the program column (01) is started by using a DeclareAction function. In a program column (08), such an event is registered in which when the program column (01) is accomplished, this fact is notified. Both the events and the actions are registered in the above-explained manner.

Figure 4:
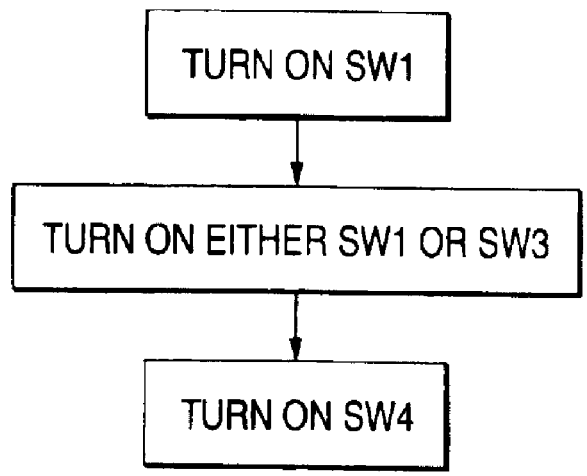
FIG. 4 is a diagram for indicating an event establishing sequence in the case that the motion program of the present invention is executed in conjunction of the flow chart.

Furthermore, in order to initiate the motion program, a relationship between the events and the actions is established by using a Subscribe function. A role of this relationship establishment is resembled to a connecting line of a flow chart. Since the relationship establishment is made, this motion program is initiated. A program column (17) implies that when the event which has been registered in the program column (06) is detected, the action which has been registered in the program column (07) is initiated. A program column (22) implies that if an event which has been registered in a program column (16), namely, the object which has been registered in the program column (05) is completed, then this event (object) completion is notified, and then this motion program is ended. In the above-explained motion program, as indicated in FIG. 4, since the SW1 is turned ON, subsequently the SW2 is turned ON, and finally, the SW4 is turned ON, the process steps of the flow chart shown in FIG. 3 are executed in this order of steps (1)→(2)→b→(3)→(4)→(5)→(6)→(7). This execution timing is indicated in FIG. 7. As apparent from this execution timing, neither a system, nor a motion program is present which are executed within a section (1) and another section (6). Accordingly, it can be judged that an execution efficiency of this embodiment is improved, as compared with that of the conventional motion program shown in FIG. 13.

Figure 5:
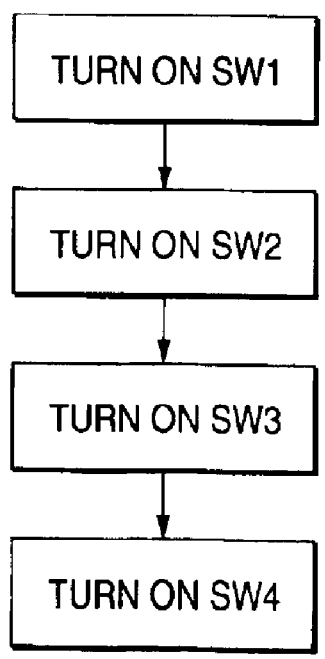
FIG. 5 is a diagram for indicating an event establishing sequence in the case that the motion program of the present invention is executed, which is different from those of the flow chart.

Alternatively, since establishing sequences of events are changed as represented in FIG. 5, program process operations different from those of the flow chart shown in FIG. 3 may be carried out. In the alternative example of FIG. 5, after the SW2 has been turned ON and thus the X-axis has been moved to the point "D", the SW3 is turned ON and thus the Y-axis is moved to the point "E."

Similarly, since the event of SW3==ON used to move the Y axis to the point "E" is changed into the event of SW2==ON in the flow chart of FIG. 3, in such a case that the SW2 is turned ON, the object for moving the X axis to the point "D" may be commenced, and at the same time, the object for moving the Y axis to the point "E" may be commenced. As a result, the instructions may be executed at the same time. It should be noted that the above-explained event detecting means is executed by making an interruption operation with respect to a CPU employed in the motion program executing apparatus.

(Embodiment 2)

A description will now be made of a second embodiment of the present invention based upon FIG. 8.

Figure 8:
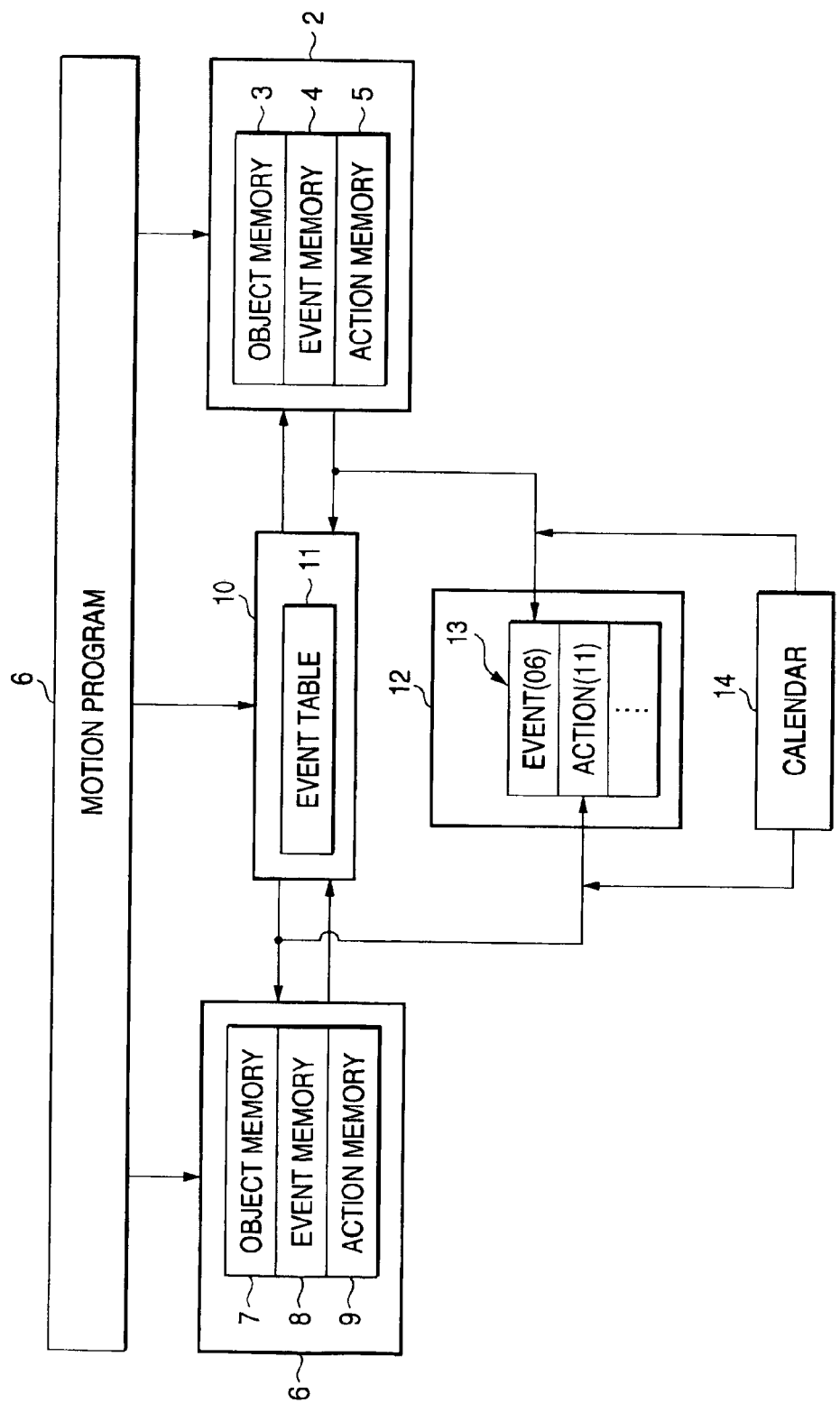
FIG. 8 is a structural diagram of a system for executing a motion program, according to a second embodiment of the present invention.
Figures 9, 10:
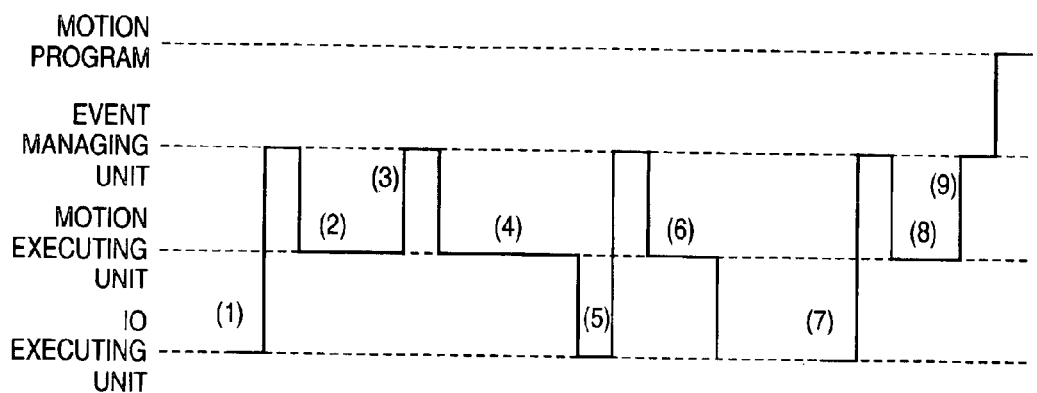
FIG. 9 is a timing chart for executing the motion program by the system of FIG. 8.
FIG. 10 shows a content of an event log table employed in the system of FIG. 8.
Figure 14:
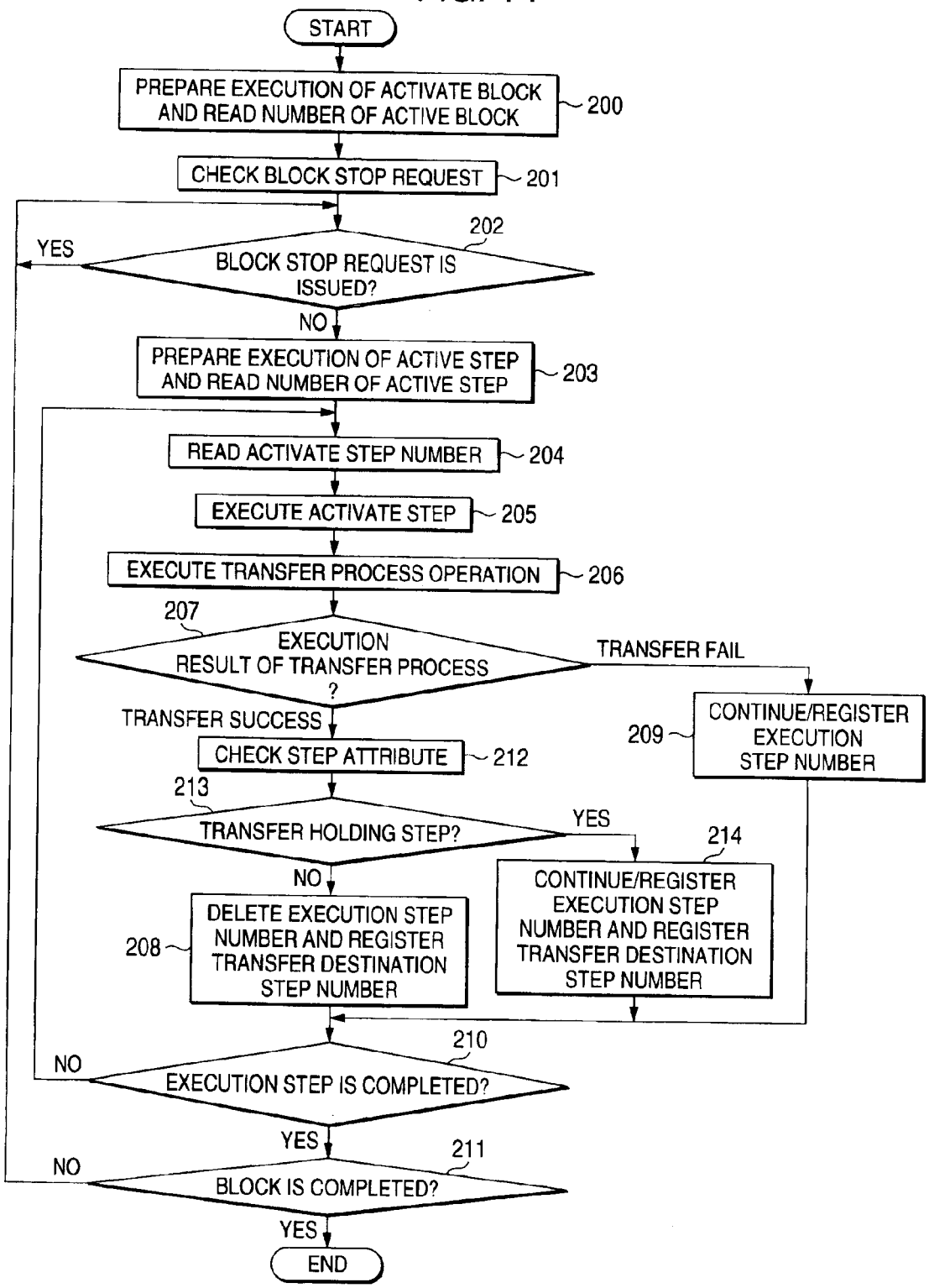
FIG. 14 is a flow chart for explaining process operations of the conventional motion program.

FIG. 8 shows a structural diagram of such a system capable of logging an execution sequence of the motion program according to the present invention. In order to log the execution sequence of the motion program, this system is provided with an event processing unit 12 and a calendar 14. The event processing unit 12 contains an event log table 13 which stores thereinto detection results of events and initiation results of actions. The calendar 14 is employed in order to acquire detection time instants of events and initiation instants of actions. FIG. 9 shows a state transition diagram in the case that the motion program shown in FIG. 6 is executed. FIG. 10 is an event log table which have logged execution conditions of FIG. 9. The respective events (1) to (9) shown in FIG. 9 are time-sequentially stored in the event log table 13 in correspondence with items (1) to (9) of FIG. 10.

As previously described, in accordance with the present invention, the motion program executing apparatus is provided by which the execution efficiency of the motion program can be improved, the execution sequence of this motion program can be changed, and the instructions can be carried out at the same time. Furthermore, while the CPU can be operated in a higher efficiency, the motion program executing apparatus can initiate the instructions without any overhead. Also, in accordance with the motion program executing apparatus of the present invention, since the simple program change is carried out, the execution sequence can be changed. Therefore, there is such a specific effect that misprogramming can be investigated within a short time, as well as the contents of the motion program can be confirmed within a short time.

What is claimed is:

1. An executing apparatus for executing a motion program which contains both a motion instruction for controlling operation of a machine, and an instruction for controlling input/output with respect to an external appliance, comprising:

a motion executing unit containing an object memory for registering thereinto said motion instruction, an event memory for registering thereinto an execution condition of said motion instruction, and an action memory for registering thereinto an execution command of said motion instruction;

an I/O executing unit containing an object memory for registering thereinto an output instruction used to control an output signal supplied to the external appliance, an event memory for registering thereinto a condition of an input signal state supplied from the external appliance, and an action memory for executing said output instruction; and an event managing unit for registering thereinto an event management table for establishing a relationship between the motion executing unit and the I/O executing unit before executing the motion instruction.

2. A motion program executing apparatus according to claim 1 wherein:

said event management table establishes the relationship between the execution conditions of a plurality of said motion instructions with respect to one of the input signal states supplied from the external appliance.

3. A debugging apparatus for debugging a motion program containing a motion program which contains both a motion instruction for controlling operation of a machine, and an instruction for controlling input/output with respect to an external appliance, comprising:

a motion executing unit containing an object memory for registering thereinto said motion instruction, an event memory for registering thereinto an execution condition of said motion instruction, and an action memory for registering thereinto an execution command of said motion instruction;

an I/O executing unit containing an object memory for registering thereinto an output instruction used to control an output signal supplied to the external appliance, an event memory for registering thereinto a condition of an input signal state supplied from the external appliance, and an action memory for executing said output instruction;

an event managing unit containing thereinto an event management table for establishing a relationship between the motion executing unit and the I/O executing unit;

a calendar for detecting both a time instant when an execution condition of the motion program is established and a time instant when an execution command of the motion program is issued; and an event log processing unit provided with an event log processing unit which stores thereinto the execution condition of the motion program, the content of the execution command, and the time instants detected by said calendar.

* * * * *